United States Patent Office 3,472,194
Patented Oct. 14, 1969

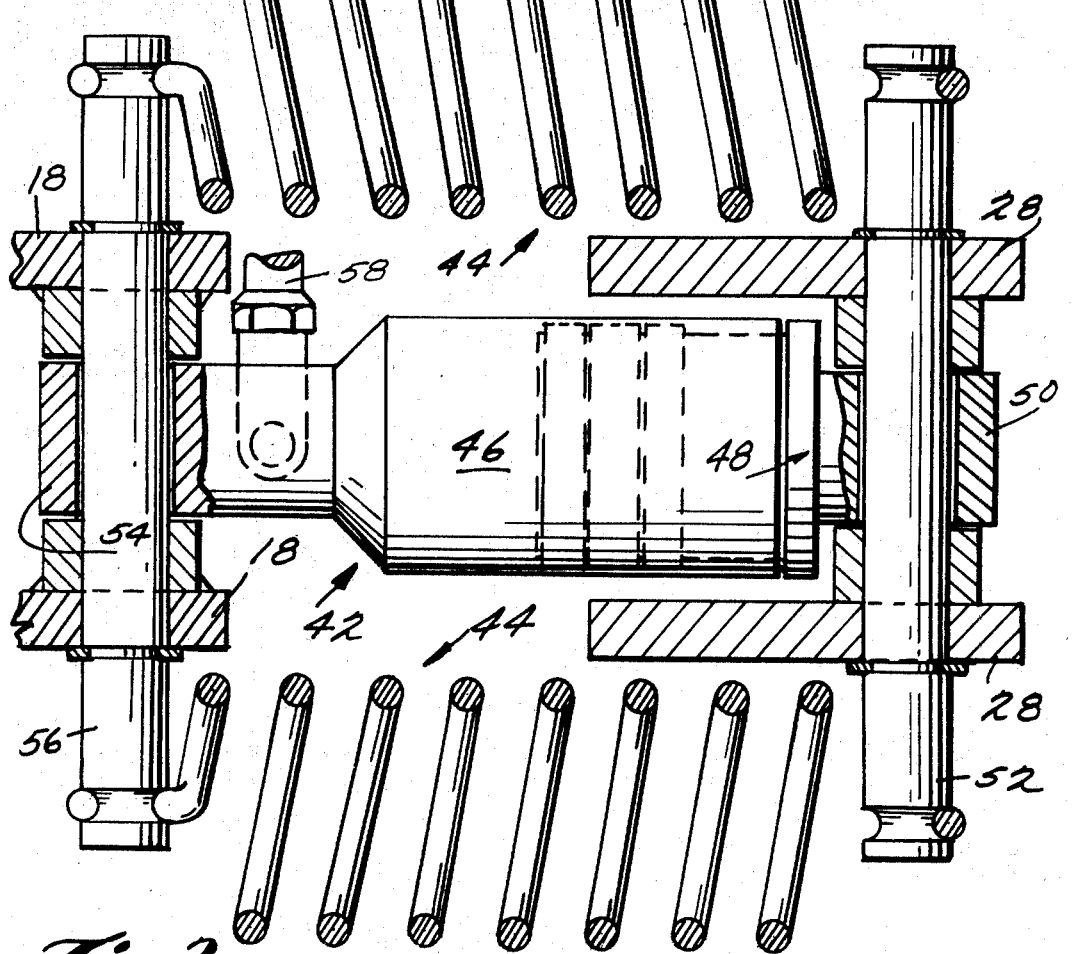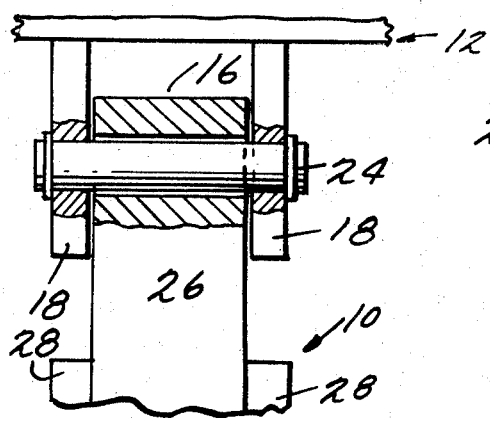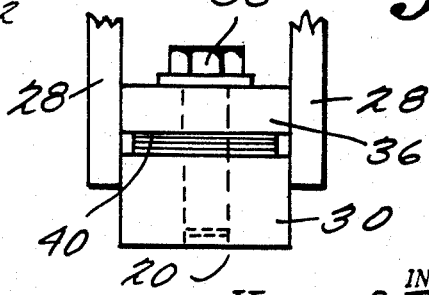
INVENTOR.
HENRY A. ROZANSKI
BY
Cushman, Darby & Cushman
ATTORNEYS

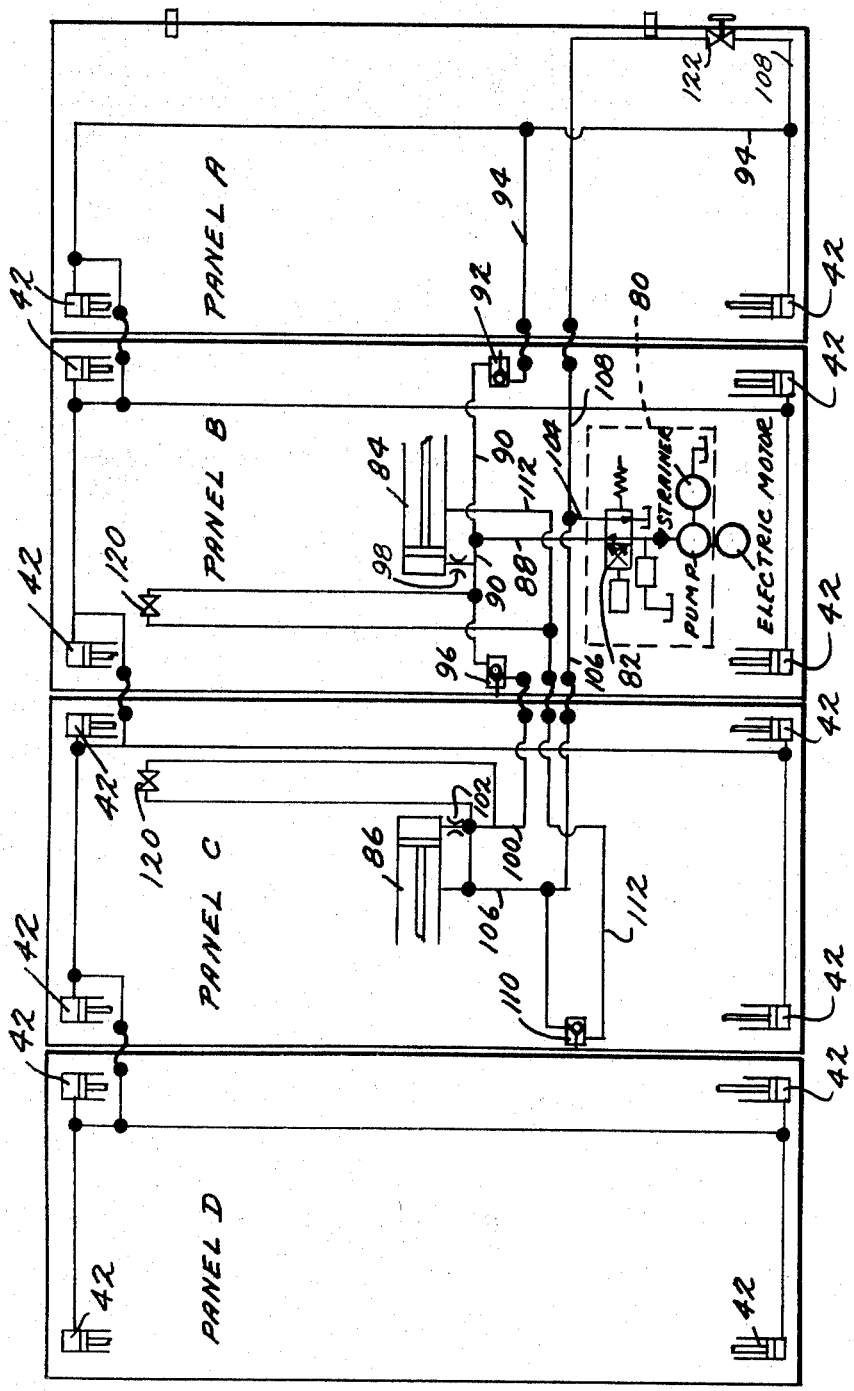

3,472,194
LOCKING DOG ASSEMBLY FOR HATCH COVERS AND HYDRAULIC SYSTEM FOR AUTOMATICALLY CONTROLLING LOCKING DOG ASSEMBLY AND HATCH COVER PANELS
Henry A. Rozanski, Elizabethtown, Pa., assignor to Wiley Manufacturing Company, Port Deposit, Md., a corporation of Delaware
Filed June 21, 1967, Ser. No. 647,803
Int. Cl. B63b 19/14, 19/24
U.S. Cl. 114—203                                       7 Claims

ABSTRACT OF THE DISCLOSURE

Locking dogs are mounted within hatch cover panels to lock and release a multi-panel hatch cover relative to a hatchway which it closes. The locking dogs include hydraulically operated means for moving the dogs to unlocked positions, and mechanical spring means move the dogs to locked positions when the hydraulically operated means is relieved of its operating pressure. The locking dogs are of an improved construction wherein one end of the dog is pivotally mounted to a portion of a hatch cover panel while a second end of the dog hangs downwardly and engages a hooking block carried adjacent to a hatchway. The actuating means for the locking dog is connected to an intermediate part of the dog and likewise carried within the hatch cover panel. Also, an improved hydraulic system is provided for releasing all locking dogs of a hatch cover in sequence and prior to folding movements of the hatch cover. The hydraulic system includes an essentially open circuit between hydraulically operated actuators for folding and unfolding individual panels of the hatch cover and the hydraulically operated locking dogs. The locking dogs operate at a lower fluid pressure than the actuators for the panels, and sequencing for folding movements is controlled by a build-up of pressure within the system and without a requirement for separately actuated valves or similar devices.

BACKGROUND AND BRIEF DISCUSSION OF INVENTION

It is known in the prior art to provide some form of hydraulically actuated locking means in association with hatch cover assemblies. Typical of such prior art constructions are those shown in Kummerman Patent 3,092,065 dated June 4, 1963 and Jerome et al. Patent 3,164,403 dated Jan. 5, 1965. However, prior art arrangements for hatch dogs have required costly installations or complex actuating arrangements which are often unreliable in use. The present invention is concerned with an improvement in locking dog assemblies for hatch covers, and the invention is particularly concerned with an improved locking dog assembly, mounting arrangement therefor, and hydraulic control system for use in combination with a system for folding and unfolding panels of a multi-panel hatch cover.

In its preferred form, the locking dog assembly of the present invention comprises a relatively simple, and easily produced, structure which is completely reliable and effective in its operation. The latching dog assembly is preferably mounted within hatch cover panels themselves, as compared to prior art arrangements wherein locking dogs have been installed into deck housings and cowlings around hatchways. It is especially advantageous to be able to mount a reliable and effective locking dog within panel structures of a hatch cover in order to remove as many mechanisms or devices as possible from around the area immediately adjacent to a hatchway. The present invention not only provides for a mounting of an improved locking dog assembly in a hatch panel, but also, all control and actuating means for all locking dogs of the hatch cover are likewise carried within the panels of the hatch cover. The improved locking dog includes a lever arm means which is pivotally suspended from a bottom surface of a hatch cover panel, and the lever arm means includes a downwardly extending terminal end which engages a hooking block carried adjacent to a hatchway, when the hatch cover is fully closed. Hydraulic means are provided for actuating the locking dog to an unlocked, or released position, and spring means are provided for automatically engaging the locking dog lever arm with the hooking block when the hydraulic means is relieved of its operating pressure. Thus, there is provided a very effective arrangement wherein single acting hydraulic actuators provide necessary unlocking movements for a plurality of locking dog assemblies about the entire perimeter of a hatch cover, and simple mechanical spring means are provided for automatically locking all locking dog assemblies when the hydraulic system associated with all locking dogs is deactivated.

The invention also provides for a novel hydraulic system for use in hatch covers of the type having a number of folding panels. It is contemplated that the hydraulic system, and the improved locking dog assembly, of this invention may be used with hatch covers of two, four, six or any well known number of panels for multi-panel hatch cover assemblies. The hydraulic system of the present invention includes a novel control means for sequencing the operation of all locking dogs of a hatch cover relative to the opening or closing of the hatch cover. The control means is included within the hydraulic circuiting of the hydraulic system which actuates (1) the locking dog assemblies and (2) well known actuators for folding and unfolding a plurality of panels associated with a hatch cover. The hydraulic control system functions to automatically sequence the unlocking and folding of a hatch cover, as well as the closing and locking of a hatch cover. The control system is constructed to include an essentially open circuit between all locking dog assemblies and actuators associated with the folding and unfolding of panels, and sequencing is controlled by a build-up of fluid pressure within the open circuit and without a requirement for separately actuated valves or other devices.

These and other features and advantages of the present invention will become apparent in the more detailed discussion which follows, and in that discussion reference will be made to the accompanying drawings which are described briefly below.

BRIEF DESCRIPTION OF DRAWINGS

FIGURE 2 is a top plan view taken at line 2—2 of FIGURE 1;

FIGURE 3 is a front elevational view of a top portion of the locking dog assembly as viewed on line 3—3 of FIGURE 1;

FIGURE 4 is a front elevational view of a bottom portion of the locking dog assembly, as seen on line 4—4 of FIGURE 1; and FIGURE 5 is a top plan view of a four panel hatch cover, illustrating schematically a hydraulic system for controlling the sequencing of locking dog operation and folding and unfolding of the hatch cover panels.

DETAILED DESCRIPTION OF INVENTION

Figure 1:
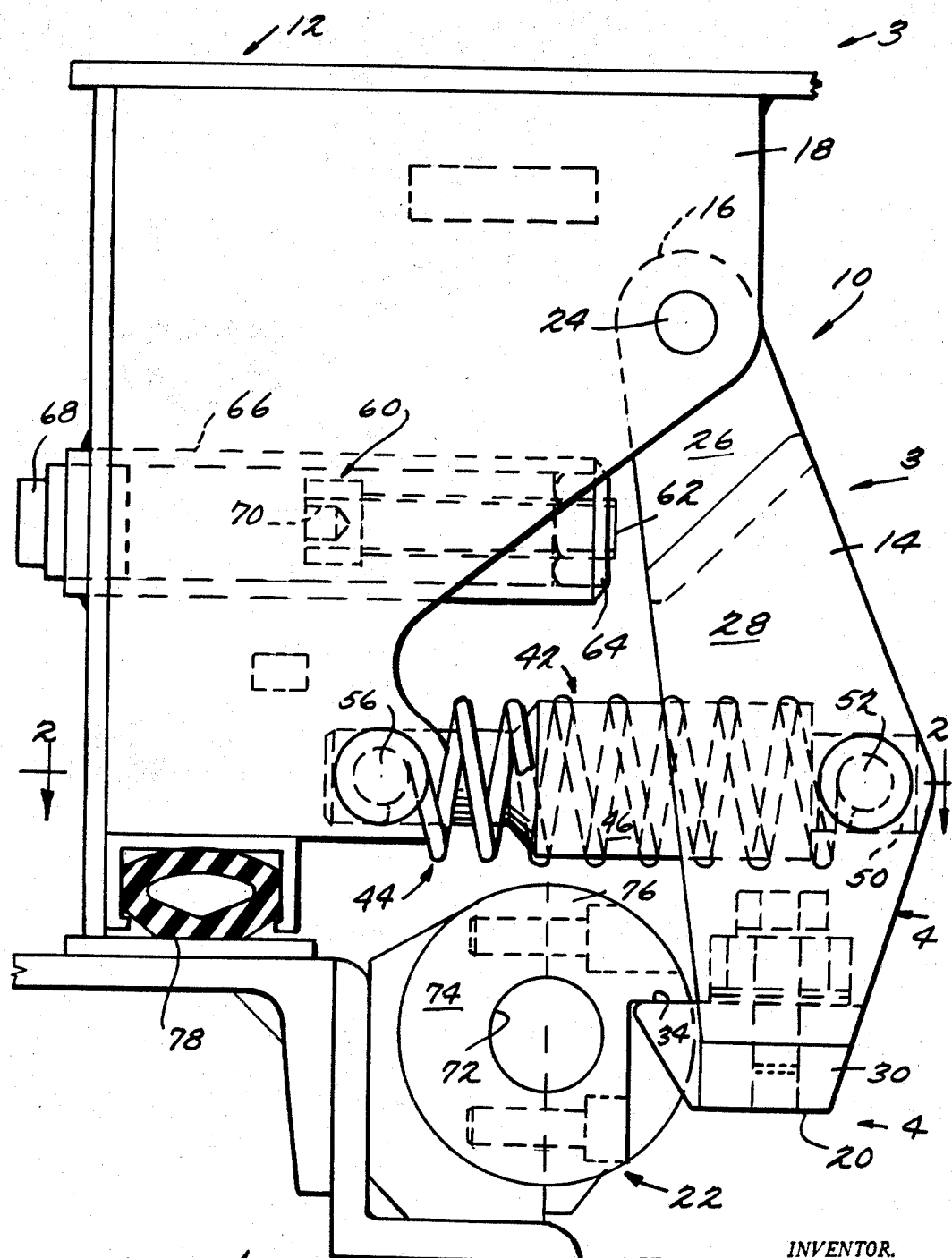
FIGURE 1 is an elevational view, in partial cross section, illustrating the improved locking dog assembly of the present invention.

The present invention is directed to improvements in hatch covers which are of well known constructions for use in closing and sealing hatchways formed in vessels.

Typical hatch covers of the type contemplated by the present invention are made up of a multiple number of individual panels which are hinged or articulated to one another in such a way that the plurality of panels of a given hatch cover can be folded and unfolded to open and close hatchways. Such constructions are well known in the art, and do not separately form a part of the present invention. However, the invention is directed to an improved structure and operation for locking dog assemblies which may be associated with well known hatch covers. When a hatch cover is moved to a fully closed position, whether it is of a single panel sliding type or a multiple panel folding type, it is desirable to firmly latch the cover tightly against a cowling or deck surface which is immediately adjacent to the hatchway which is being covered. Hatch covers may protrude above a deck or may be mounted flush therewith in accordance with the requirements of the particular vessel in which they are installed, but in any case, it is desirable to firmly latch and seal all such hatch covers once they are in fully closed positions.

Referring to FIGURES 1 through 4, an improved locking dog assembly in accordance with the present invention is illustrated in its mounted position relative to a hatch cover panel and the periphery of a hatchway over which the panel is closed. It is to be understood, that a plurality of such hatch dog assemblies may be provided about the entire perimeter, or along the longitudinal edges, of whatever hatch cover is being used. The improved locking dog assembly 10 is preferably mounted within a hatch cover panel 12 so that there is no necessity in providing costly installation of the locking dogs in deck portions of a vessel. The locking dog assembly 10 is not only carried within the panel 12, but all means for operating and actuating the locking dog assembly are likewise carried within the panel. This feature substantially reduces costs in installation, operation, and maintenance of latching devices normally associated with hatch covers.

The locking dog assembly 10 includes a lever arm means 14 having a first end 16 pivotally mounted to a bracket or other mounting plates 18 carried within the panel 12. The lever arm means 14 also has a second end 20 which depends downwardly from a closed hatch cover panel so as to engage a hooking block means 22 carried adjacent to the hatchway which is being covered. The pivotal mounting of the lever arm means 14 is provided by suspending the lever arm means from a pin 24, and suitable bushings or bearings may be utilized to fix the position of the pin 24 relative to the mounting bracket 18. Also, bushings may be provided between the pin 24 and the boring within the lever arm means through which the pin passes so as to provide relatively free movement of the lever arm means relative to the pin. The lever arm means 14 is illustrated as being made up of an upper element 26 to which a pair of lower elements 28 are rigidly affixed, such as by welding. This arrangement provides for a very strong structure which includes a space within the intermediate portion of the lever arm 14, and the space is occupied by an actuating means for the lever arm which will be described in greater detail below. The second, or lower, end 20 of the lever arm means 14 is provided with a nose portion 30 which functions to engage a downwardly directed bearing surface of the hooking block means 22. The nose portion 30 of the lever arm extends outwardly towards the cowling of the hatchway so as to provide a firm engagement of the locking dog assembly along the bearing surfaces 34 when the locking dog is moved to a latch position. As shown in greater detail in FIGURE 4, the nose portion 30 may be vertically adjustable relative to the remainder of the lever arm means 14. Vertical adjustment of the nose portion 30 is provided by removably attaching the nose portion to a fixed element 36 which is welded across the space formed between the lower elements 28 of the lever arm means. In the illustrated embodiment, the nose portion 30 is carried by a threaded bolt 38, and washers, or other spacing elements 40 may be interposed between the element 36 and the nose portion 30 for setting the vertical position of the nose portion 30 relative to the remainder of the lever arm means. In this manner, the nose portion may be vertically adjusted after a hatch cover is installed in a vessel so as to precisely position the upwardly directed engaging surface of the nose portion relative to a downwardly directed engaging surface of a hooking block means carried adjacent to the hatchway.

Turning now to the actuating mechanism for the locking dog assembly, FIGURES 1 and 2 illustrate a preferred arrangement for moving the lever arm means 14 relative to the panel in which it is carried and relative to the hooking block means 22 with which it latches. The actuating mechanism is positioned within the hatch panel 12 so as to contact an intermediate portion of the lever arm means 14. The latching mechanism includes hydraulic means 42 for pushing or moving the lever arm inwardly away from the perimeter of a hatchway so as to disengage the lever arm from contact with the hooking block means 22. Reverse swinging movement of the lever arm means is provided by spring means 44 which function to move the lever arm to a latched position when operating pressure within the hydraulic means 42 is relieved. Thus, there is provided a system which requires hydraulic actuation only when the locking dog is to be released from a locking engagement, and latching of the dog is accomplished automatically by a reliable spring means which effects locking movement of the locking dog as soon as the hydraulic means is deactivated. The advantages in this arrangement reside in the simplicity of construction and in the requirement for a single acting hydraulic means 42 for the assembly. This arrangement eliminates requirements for costly and complex hydraulic systems which moved prior locking dog elements in both directions of movement and which required complex, and often unreliable, valving and switching devices to accomplish both latching and unlatching movements.

The hydraulic means 42 which is illustrated is of any well known construction and comprises a cylinder for casing 46 in which is mounted a piston means for reciprocal movement back and forth along the longitudinal axis of the cylinder. The piston means is connected to an outer end 48 of the actuating mechanism so that the outer end is moved back and forth with the movements of the piston. Outer end 48 of the hydraulic means includes a mounting means 50 which connects the hydraulic means to the lever arm 14 by way of a pin 52 carried by the lever arm means. The pin 52 passes through a bore which is provided in the mounting element 50 and suitable bushings and bearing elements may be provided between the mounting element 50 and the pin and lever arm means so as to provide relatively free movement between the various elements. An inner end 54 of the hydraulic means is likewise mounted on a separate pin 56 carried within a portion of the mounting bracket 18 discussed above. The piston within the cylinder 46 moves towards the right of the FIGURES 1 and 2 views so as to move the lever arm means into an unlatched position relative to the hooking block 22. Such movement of the piston is provided by the application of hydraulic fluid pressure, and a conduit means 58 is illustrated in FIGURE 2 as a part of the hydraulic circuit which conducts fluid into and out of the cylinder 46. Passageways are provided within the hydraulic means 42 so that hydraulic fluid may move into the cylinder 46 and force the piston to the right, when viewed as in FIGURES 1 and 2, so as to effect an unlatching of the locking dog assembly.

Latching movement, or movement toward the left of FIGURES 1 and 2, is provided by the pair of springs 44 which are stretched between the pins 52 and 56 so as to pull the lever arm means 14 to the left when operating pressure within the cylinder 46 is relieved. The pins 52 and 56 were discussed above with respect to their functions as mounting elements for the hydraulic means 42, and it can be seen that the pins 52 and 56 also function as mounting elements for the spring means 44. Thus, the pins 52 and 56 provide a simple, but strong mounting arrangement for the entire actuating mechanism associated with the locking dog assembly of this invention.

FIGURE 1 also illustrates a means for mechanically releasing, or unlatching, individual locking dog assemblies in the event that there is a failure in the hydraulic system which normally releases the locking dogs. The releasing means 60 which is shown in FIGURE 1, includes a threaded element 62 which can be advanced toward the lever arm means 14 for moving the same out of engagement with the hooking block 22. The threaded element 62 is carried within a threaded nut 64 and is normally completely out of engagement with the lever arm means for all normal swinging movements of the lever arm. However, in the event of a hydraulic failure within the hatch cover hydraulic system, the threaded element 62 can be turned and advanced to unlatch the locking dog assembly. The releasing means 60 may be installed within a tubular body 66 carried in a side wall portion of the panel 12. Plugging or capping means 68 may be threaded to an outside surface of the tubular member 66 so as to seal the same from moisture or atmospheric conditions. When it is desired to use the mechanical means for releasing the locking dog assembly, the cap 68 is removed, and a long stemmed wrench member is inserted into an irregular-shaped opening 70 carried at the end of the threaded member 62. By turning the wrench, the threaded member 62 can then be advanced to release the locking dog assembly.

FIGURE 1 also illustrates a preferred type of hooking block 22 which may be used with this invention, however, it is to be understood that any ledge means or engaging surface can be provided along the edge of a hatchway to engage the nose portion 30 of the locking dog assembly. The hooking block 22 which is illustrated is fitted over a pipe or rod means 72 positioned around the periphery of the hatchway to permit the running of cables and lines down into the hatchway without chaffing or rubbing the cowling around the hatchways opening. The hooking block 22 comprises two elements 74 and 76 which are bolted together to embrace the pipe or rod 72. The element 76 includes a downwardly directed bearing surface for engaging the nose portion of the locking dog assembly.

A gasket means 78 may also be carried within the hatch cover panel in a well known manner. It is contemplated that the gasket 78 may be an inflatable type which includes means for admitting fluid pressure to its interior so as to expand the gasket into a tight sealing engagement with all surfaces which it contacts. However, with the locking dog assembly of this invention, it is not intended that the inflatable gasket support the weight of the hatch cover or provide for any latching movement of the locking dog assembly.

FIGURE 5 illustrates a novel hydraulic system for use with the improved locking dog assembly of the present invention. The hydraulic system is shown as incorporated in a four panel hatch cover, but it is to be understood that the same principles of the system, which is to be described below, can be utilized in hatch covers having a different number of panels. The illustrated hatch cover includes two pairs of panels with a first pair being made up of panels A and B and a second pair being made up of the panels C and D. Panel A is hinged to the deck of a ship in a known way, and the remaining panels fold, from the unfolded condition shown, to stack at the end of the hatchway at which panel A is hinged. Thus, a folding or opening of the hatch cover illustrated in FIGURE 5 would require a separate folding of the two separate pairs of panels. It is known in the prior art to provide for a sequencing of folding wherein the panels A and B are initially folded as a pair until they are in a substantially stacked condition at the end of the hatchway to which panel A is hinged. While the pair of panels A and B are folding, the panels C and D are usually jacked up so as to release gaskets carried by those panels from contact with the hatchway, and the panels C and D then roll along until panels A and B are folded. Upon completion of the folding movement for panels A and B, panels C and D are then folded until they are in a completely stacked condition. Various prior art attempts have been made to provide for the sequence just described, as exemplified by McBride, Jr. 2,857,874, dated Oct. 28, 1958, and generally, the sequencing of multi-panel hatch covers has been accomplished either by electrical or hydraulic systems which must be switched or actuated by valving devices. The McBride patent, just referred to, describes one type of hydraulic system for effecting sequential folding of hatch cover panels, and also, dogging mechanisms are shown in McBride as being controlled by the sequencing system. The system which is illustrated in FIGURE 5 represents an improvement over prior hydraulic or electrical arrangements for sequencing the folding of hatch cover panels, and the present invention provides for a completely hydraulic system which greatly reduces the number of switches or separately operated valving devices which must be included to make such a system operable. By its simplicity, the system of the present invention represents a substantially improved and more reliable arrangement for accomplishing a sequencing of locking dog actuation relative to panel folding and unfolding actuations.

The schematic diagram of FIGURE 5 shows a source of hydraulic fluid, and a pumping means therefor, in the form of a compact power unit 80 which may be built completely within the confines of one of the panels of the hatch cover. One form of a typical compact power unit which may be so installed is illustrated in Richter Patent 3,310,913, dated Mar. 28, 1967, but not all of the features of the Richter patent need to be included and similar compact units of the type shown in FIGURE 5 may be installed. The compact power unit includes a reservoir of hydraulic fluid, and a motor driven pump is immersed in the reservoir of hydraulic fluid for pumping fluid to all parts of the hydraulic circuiting associated with the folding of individual panels and the actuation of locking dog assemblies. A solenoid operated valve 82 is included within the compact power unit for directing the flow of fluid in accordance with an electrical signal directed from a control panel at a remote part of the vessel. From the compact power unit 80, hydraulic fluid is pumped to actuators for folding and unfolding the panels and also to the hydraulic means 42 which have been discussed above for each of the locking dog assemblies carried by individual panels. Actuating means 84 and 86 are provided for folding the separate pairs of panels A–B and C–D, respectively. The actuating means 84 and 86 may be of any well known construction, such as illustrated in Patent 2,491,261, dated Dec. 13, 1949, and also, hydraulically operated power hinge means may be substituted for the actuators 84 and 86. The specific constructions of the actuating means 84 and 86 do not form a separate part of the present invention, and these actuators, as well as the hydraulic means 42 which are discussed above, are illustrated in schematic form for simplicity of discussion.

The hydraulic system of FIGURE 5 will be discussed with reference to sequential opening and closing movements of the hatch cover shown. Solenoid operated valve 82 is shown in a position for initiating an opening movement of the hatch cover, and this movement requires an initial sequence which unlatches all locking dog assemblies prior to any actual folding movements of the separate pairs of panels. Accordingly, hydraulic fluid is pumped, in response to a signal directed to the pump motor, through the conduit 88, and from there the fluid flows towards both ends of the hatch cover through the conduit 90. One branch of the conduit 90 communicates with the hydraulic system for unlatching all of the locking dog assemblies by way of a plunger operated check valve 92. When it is desired to open a hatch cover, fluid can flow through the check valve 92 and into a conduit 94 from where it travels to all of the locking dog assemblies. The hydraulic means 42 associated with each of the locking dog assemblies respond to a fluid pressure between 500 to 600 p.s.i., and when pressure within the system builds up to that level, all hydraulic means 42 are moved to unlatch the individual lever arms associated with each of the locking dog assemblies. At the same time, fluid may flow from the conduit 88 into a second branch which carries fluid to the actuators 84 and 86. During initial folding movements, fluid cannot flow past a second plunger operated check valve 96 because it is in a fully closed position which prevents any fluid flow until the pair of panels A and B have been first folded. However, it is possible for hydraulic fluid to initially flow through a variable restrictor 98 and into a cylinder associated with the actuator 84. It is a feature of the present invention that no pressure responsive valves, or other seprately operated valves or switches, are required for continuing a sequential opening and closing of a multi-panel hatch cover even where the latching and unlatching of locking dog assemblies must be included within the sequences. The variable restrictor 98 is not a pressure responsive valve, but rather a restrictor valve which can be adjusted to control the rate of folding movement for the panels A and B. Since hydraulic fluid may flow into the actuator 84 at the very beginning of an opening operation, the actuator 84 is designed to respond to a much higher fluid pressure than the hydraulic means 42 associated with the individual locking assemblies. Thus, as pressure builds up in the system by the operation of the pump in the compact power unit 80, there is an initial pressure level which is sufficient to move all locking dogs into unlatched positions. This initial pressure level is insufficient to operate the actuator 84, and therefore, no folding action of the first pair of panels A and B begins until after all locking dog assemblies have been unlatched. In a typical construction which has been made for the present invention, the actuator 84 is designed to operate at a pressure of approximately 1800 p.s.i. before it can lift and fold the pair of panels A and B. When the pressure within the hydraulic system reaches that level, the actuator 84 is then caused to move so as to fold panels A and B. When panels A and B reach a fully folded condition, a plunger element associated with the plunger operated check valve 96 is released so as to permit flow of fluid through the check valve 96 and to the second actuator 86 by way of conduit 100. The plunger operated valve 96 is operated in any well known manner, such as by the provision of a protruding finger element which contacts the edge of panel C when the panels are fully unfolded as shown in FIGURE 5. As the panels A and B fold, the edge of panel B which adjoins panel C also folds relative to the horizontally disposed panel C, and eventually, the finger element of the plunger disengages from contact with the edge of panel C. This disengagement releases a check valve in 96 so as to permit the flow of fluid toward actuator 86. Any well known construction of a mechanically operated check valve may be provided for the just described valve 96. Hydraulic fluid flows into actuator 86 by way of a variable restrictor 102 of the type discussed for the actuator 84. When all panels have reached a fully folded condition, pumping of hydraulic fluid is stopped by shutting down the pump from a control panel. Also, when all panels are fully folded, a finger element carried by the plunger operated check valve 92 is positioned to contact a surface of panel A and to thereby permit a back flow of hydraulic fluid through the conduit 94 and back into conduit 90. This relieves the hydraulic means of the locking dog assemblies of fluid pressure and permits the locking dog lever arms to be moved outwardly toward the edges of the panels by the springs 44.

Closing the hatch cover of FIGURE 5 is a reverse operation from that described for the opening of the hatch cover. For a closing operation, the solenoid valve 82 of the power unit is moved to its second position so that fluid is pumped from the power unit reservoir through conduit 104. From there, the fluid can branch in two directions into conduits 106 and 108. Flow of fluid through conduit 106 builds up a sufficient pressure to reverse the actuator 86 from its previously described direction of movement. However, fluid flow is prevented from reaching actuator 84 by a third plunger operated check valve 110 which does not permit the flow of fluid therethrough until panels C and D reach a fully unfolded condition. A finger member in the check valve 110 is caused to release the checking action of the valve once the panels C and D are unfolded and when the finger element contacts an adjoining edge of panel D. When this takes place, fluid flows through conduit 112 so as to effect an unfolding movement of panels A and B by the operation of actuator 84. During unfolding movements of the panels, it should be noted that fluid can also flow through conduit 108 to once again move the hydraulic means 42 in a direction that maintains all locking dogs in unlatched positions. This step would not be required in a two panel hatch cover. However, where three or more panels are to be included in a folding hatch cover, it is necessary that all locking dogs associated with the panels be maintained in an unlatched position until all panels have unfolded and stopped their movements along the length of the hatchway which is to be covered. Of course, the pressure which exists for operating the actuators 86 and 84 in sequence is sufficient to maintain all of the hydraulic means 42 in positions to unlatch all locking dogs. When all panels have reached fully unfolded positions and are back to the positions shown in FIGURE 5, the plunger operated check valve 92 is released from engagement with panel A, and a back flow of fluid is permitted through conduits 94, 90 and 88, and from there the fluid is dumped into the reservoir of the compact power unit 80. This means that operating pressure for all of the hydraulic means 42 is relieved sufficiently for the spring means 44 to automatically engage and latch all locking dog assemblies when the hatch cover has reached its fully closed position.

FIGURE 5 also illustrates bypass valves 120 which are normally closed, and these valves are opened only when it is necessary to relieve fluid pressure within the hydraulic system for mechanically unlatching the individual locking dog assemblies with the means 60 discussed for FIGURE 1. Also, a venting valve 122 may be provided, and this valve is kept closed during operation of the system.

Having described the invention with reference to a preferred embodiment, it can be appreciated that certain variations and changes will become obvious to those skilled in the art. Such obvious variations and changes are intended to be included within the scope of this invention.

What is claimed is:

1. A locking dog assembly for automatically locking hatch covers in closed positions comprising:
  a lever arm means having a first end pivotally mounted to a portion of a hatch cover, and a second end for engaging a hooking block means carried by a portion of a cowling surrounding the opening to be covered by the hatch cover, said second end of the lever arm means depending downwardly from the hatch cover portion when the hatch cover is closed,
  an actuating mechanism mounted between upper and lower surfaces of the hatch cover for swinging said lever arm means back and forth about its pivotally mounted first end so as to lock and release the second end of the lever arm means into and out of engagement with said hooking block means, said actuating mechanism being connected to a portion of said lever arm means which is intermediate said first and second ends of the lever arm, said actuating mechanism being extendible by hydraulic means and retractable by spring means, said hydraulic means functioning to urge said lever arm into an unlocking or releasing position relatice to said hooking block means, whereby said lever arm means is hydraulically operated to release and unlock the hatch cover but mechanically operated to effect locking of the hatch cover upon its closure, and a nose portion included on said second end of the lever arm means, said nose portion comprising a separate element adjustably mounted on said lever arm, and said nose portion extending outwardly toward the cowling of the hatchway so as to engage a stop surface provided in said hooking block means.

2. The locking dog assembly of claim 1 and including control means for admitting hydraulic fluid into said hydraulic means for moving said locking dog assembly from a locked position when said hatch cover is to be opened.

3. The locking dog assembly of claim 1 and including means for mechanically moving said lever arm from a locked to an unlocked position in event of failure of said hydraulic means.

4. The locking dog assembly of claim 2 wherein said hatch cover is opened and closed by hydraulic means, and included in said control means a sequencing means for causing said locking dog to be automatically released from a locked position prior to the hydraulic actuation of said hatch cover to an open position.

5. The locking dog assembly and control means of claim 4 wherein said sequencing means further comprises a system for hydraulically maintaining a plurality of locking dog assemblies in unlocked positions until all panels of a multi-panel hatch cover have been closed.

6. The locking dog assembly and control means of claim 5 wherein said sequencing means comprises a system which includes:

hydraulically operated actuators for folding and unfolding a multi-panel hatch cover said hydraulically operated actuators operating at a higher fluid pressure than said hydraulic means for operating said locking dogs, a source of hydraulic fluid and means for pumping said fluid to said hydraulic means associated with said plurality of locking dog assemblies and to said actuators for the panels, a circuit means through which hydraulic fluid may flow between said pumping means, said hydraulically operated actuators, and said plurality of locking dog assemblies, and means for opening said circuit means so that hydraulic fluid can be pumped simultaneously to said locking dog assemblies and to said actuators in accordance with a sequence whereby all of said locking dogs can be moved to unlocked positions prior to initial folding movements of the hatch cover by a build-up of hydraulic pressure within said open circuit means and without a requirement for separately operated valves or actuators.

7. A locking dog assembly for automatically locking hatch covers in closed positions comprising:

a lever arm means having a first end pivotally mounted to a portion of a hatch cover, and a second end for engaging a hooking block means carried by a portion of a cowling surrounding the opening to be covered by the hatch cover, said second end of the lever arm means depending downwardly from the hatch cover portion when the hatch cover is closed, an actuating mechanism mounted between upper and lower surfaces of the hatch cover for swinging said lever arm means back and forth about its pivotally mounted first end so as to lock and release the second end of the lever arm means into and out of engagement with said hooking block means, said actuating mechanism being connected to a portion of said lever arm means which is intermediate said first and second ends of the lever arm, said actuating mechanism being extendible by hydraulic means and retractable by spring means, said hydraulic means functioning to urge said lever arm into an unlocking or releasing position relative to said hooking block means, whereby said lever arm means is hydraulically operated to release and unlock the hatch cover but mechanically operated to effect locking of the hatch cover upon its closure, and a nose portion included on said second end of the lever arm means, said nose portion extending outwardly toward a cowling of the hatchway so as to engage a stop surface included in said hooking block means, and said nose portion of the lever arm having (a) an upwardly directed stop surface for engaging a downwardly directed stop surface of said hooking block means, and (b) a downwardly directed inclined bearing surface on said nose portion for permitting the lever arm to swing against the normal bias of said spring means while said nose portion is moving downwardly past the hooking block means when a two panel hatch cover is being moved to a closed position.

References Cited

UNITED STATES PATENTS

| 3,007,431 | 11/1961 | Dahlin | 114—202 |
| 3,180,302 | 4/1965 | Hamilton | 114—203 |

ANDREW H. FARRELL, Primary Examiner